(12) United States Patent
Su et al.

(10) Patent No.: US 6,757,007 B1
(45) Date of Patent: Jun. 29, 2004

(54) MODULAR ELECTRONIC IMAGE-CAPTURING SYSTEM WITH DUAL FUNCTIONAL MODES

(75) Inventors: Jesse Su, Chung Ho (TW); Matthew Tsu-Yang Chang, Fremont, CA (US)

(73) Assignee: Nucam Corporation, Taipei (TW)

( * ) Notice: Subject to any disclaimer, the term of this patent is extended or adjusted under 35 U.S.C. 154(b) by 0 days.

(21) Appl. No.: 10/321,395

(22) Filed: Dec. 18, 2002

(51) Int. Cl.[7] .................. H04N 5/253; H04N 5/222; H04N 5/225
(52) U.S. Cl. .................. 348/96; 348/370; 348/375
(58) Field of Search .................. 348/64, 68, 75, 348/96, 97, 102, 260, 262, 552, 210

(56) References Cited

U.S. PATENT DOCUMENTS

| | | | | |
|---|---|---|---|---|
| 3,988,749 A | * | 10/1976 | Frode et al. | 396/231 |
| 4,818,861 A | * | 4/1989 | Horiuchi et al. | 250/235 |
| 5,053,794 A | * | 10/1991 | Benz | 396/432 |
| 5,294,948 A | * | 3/1994 | Merkt et al. | 396/544 |
| 5,745,170 A | * | 4/1998 | Palmer | 348/217.1 |
| 6,169,571 B1 | * | 1/2001 | Rivers et al. | 348/96 |
| 6,330,401 B1 | * | 12/2001 | Greene | 396/432 |
| 6,542,179 B1 | * | 4/2003 | Kurtz et al. | 348/97 |
| 6,564,015 B2 | * | 5/2003 | Ishikawa et al. | 396/206 |
| 2001/0012056 A1 | * | 8/2001 | Arai et al. | 348/96 |
| 2002/0001464 A1 | * | 1/2002 | Ohsawa | 396/50 |
| 2002/0024596 A1 | * | 2/2002 | Groschup et al. | 348/96 |

\* cited by examiner

*Primary Examiner*—Andrew Christensen
*Assistant Examiner*—Tia M. Harris
(74) *Attorney, Agent, or Firm*—Rosenberg, Klein & Lee

(57) ABSTRACT

A modular electronic image-capturing system comprises at least two detachable and interchangeable image-forming modules and an electronic image-capturing module. The image-forming modules include a film-scanning module with the lens designed for short conjugate distances and an image-forming lens designed for long conjugate distances for general photography. The film-scanning module has an illumination device for illuminating transparent film. The film-scanning module also includes a film carrier which accepts and places at least one piece of photographic films in correct location. The modular electronic image-capturing system further includes the control circuits and connecting interface in order to manipulate the image-forming modules.

5 Claims, 17 Drawing Sheets

MODULAR ELECTRONIC IMAGE-CAPTURING SYSTEM WITH DUAL FUNCTIONAL MODES

BACKGROUND OF THE INVENTION

1. Field of the Invention

The present invention generally relates to a modular electronic image-capturing system that has dual mode of operation, and more particularly to the image-capturing system is used for an electronic camera for general photography or a transparent film image-capturing device depending on the image-forming modules attached.

2. The Related Art

Up to today, it is known to make the optical duplication of photographic film in the form of negative or diapositive transparencies by a conventional image-capturing apparatus with linear image sensor. An example of such systems is disclosed in U.S. Pat. Nos. 4,974,068, 5,088,813 and 5,872,591. In the '068 patent, there is a film image information reading apparatus which includes adjustment means for adjusting the gain of the image. In the '813 patent, a film scanner is disclosed which comprises: means for urging the film against the support means; the urging means contacting the film along an edge thereof, and guide means for maintaining the film substantially flat in the imaging station. The '591 patent discloses a photographic film scanner for scanning a film strip containing a plurality of photography images.

In certain types of apparatus, for example, film scanners, the film must be scanned by the linear image sensor. However, the image-scanning system of past method take much time to scan a transparent film, and user have to browse through pictures on an additional screen, like a CRT screen or a TV. Conventional methods take many steps and much time to transform the image data to digital. Such devices, known as film scanners are often presented as computer peripheral devices with a single dedicated function, namely film recording.

On the other hand, there exists an electronic imaging device, which captures images onto a 2-dimensional electronic array sensor such as CCD (charged-coupled-device) or CMOS (complementary metal-oxide semiconductor) sensors. Such device is often used for general photography in which the image could be digitized into computer readable format for easy image processing and storage. Such device is better known as digital camera.

SUMMARY OF THE INVENTION

The object of the present invention is to provide a modular electronic image-capturing system with dual functional modes having at least two interchangeable and detachable modules which can be use for both general photography and film image capture. The output of the electronic image-capturing system could be in the form of analogue signal or digital signal.

Another object of the present invention is to provide a modular electronic image-capturing system with dual functional modes in order to apply the method of 2-dimensional image capture on transparent film. Such method eliminates the use of an otherwise complicated mechanical scanning mechanism. The 2-dimensional image recorded on the film is simultaneously captured imaged onto a 2-dimensional sensor array such as 2-dimensional CCD (charged-coupled-device) or CMOS (complementary metal-oxide semiconductor).

According to one embodiment of the invention, it is an object of the present invention to provide a modular electronic image-capturing system in which an image-forming component can be in the form of an optical lens designed for long conjugate distances for general photography.

According to another aspect of the invention, the image-forming component can be a fixture that consists of an optical lens specifically designed for short conjugate distance. The fixture also consists of a film carrier that hold and register the film. The transparent film could be in the form of a filmstrip or the film which could be mounted in a frame, similar to the common negative filmstrips and mounted diapositive transparencies respectively. In addition, the fixture also possesses an illumination device that is used to back-illuminate the film. The illumination can be provided by auxiliary light emitting elements such as but not limited to light emitting diodes, florescence discharge lamps, and inert gas discharge flash lamps. The illumination brightness or duration would be controlled by the image-capturing device. The electrical energy that powers the illumination could be supplied by a build-in energy source that resides in the image-forming fixture. Alternatively, the electrical energy could be supplied by the image-capturing device. The illumination can be in the form of redirected light originated from the electronic image-capturing device. Such configuration would require light coupling and guiding using light pipes of either solid or hollow construction. In such case, the image-forming fixture can be a passive device, which contains no electrical components. Consequently, the image-forming fixture is only attached to the image-capturing device by mechanical linkage.

A modular electronic image-capturing system with dual functional modes of the present invention includes a module which can scan a photographic film onto a 2-dimensional electronic array sensing device such as CCD (charged-coupled-device) or CMOS (complementary metal-oxide semiconductor) sensors and creates corresponding digital representations of the images, and another module which can take the digital images as the conventional digital camera.

Although the functions of the film-scanning module and a digital still camera are very different, there are substantial similarities between the two classes of devices. Both devices capture images in electronic form. Both devices require some sort of image-forming device that produces the images onto the electronic detector. Both devices possesses similar electronic signal processing components, which convert raw electronic signal generated at the sensor to output signal of certain standardized format.

For a digital camera, the image-forming device is in the form of an optical lens that is designed for long object conjugate distances. In a digital film scanner, the image-forming device is in the form of a copy lens that is designed specifically for short conjugate distances.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

The preferred embodiments of this invention will be described in detail with reference to the drawings.

Figure 1:
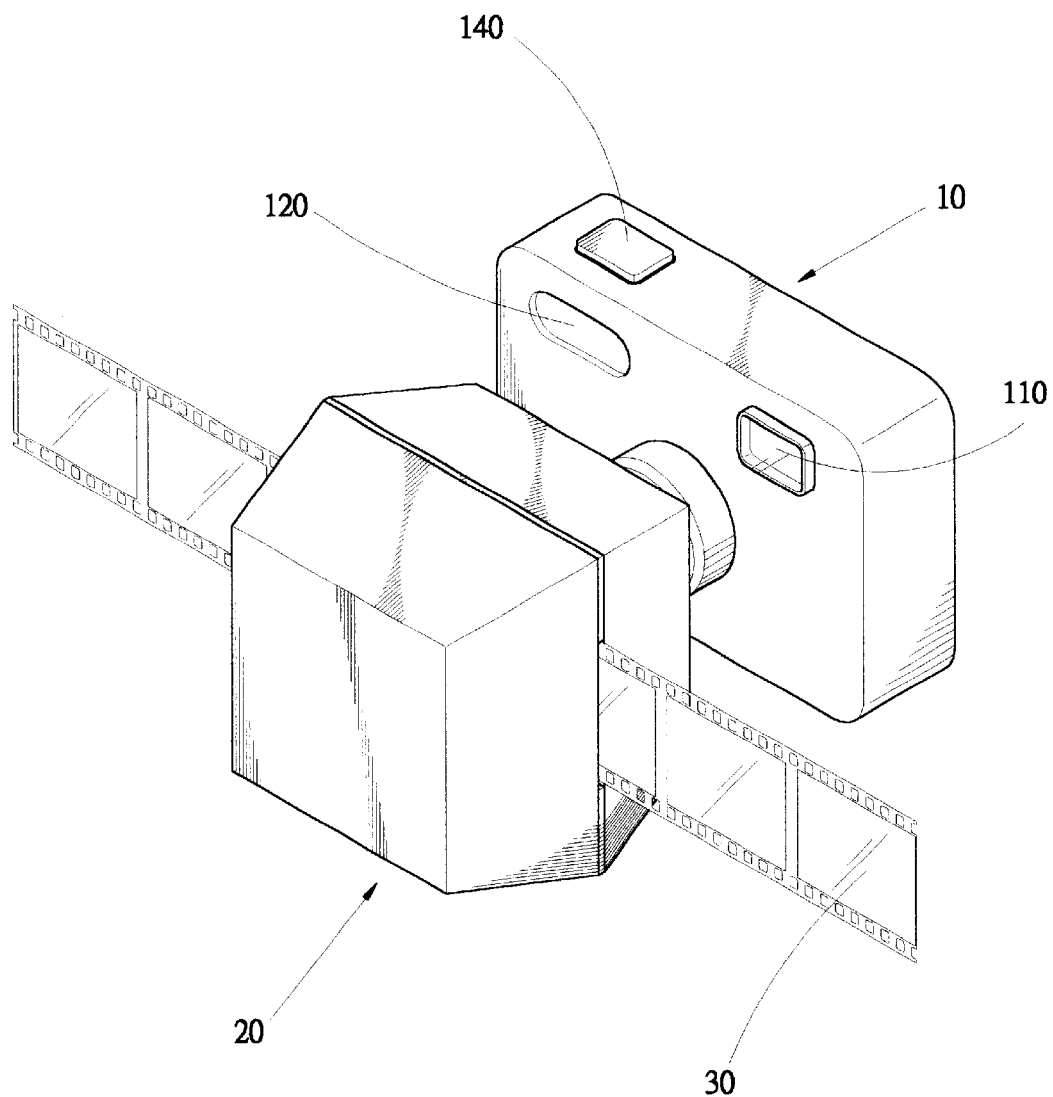
FIG. 1 is a perspective view illustrating the combination of the image-capturing module and the film-scanning module of the present invention.
Figure 2:
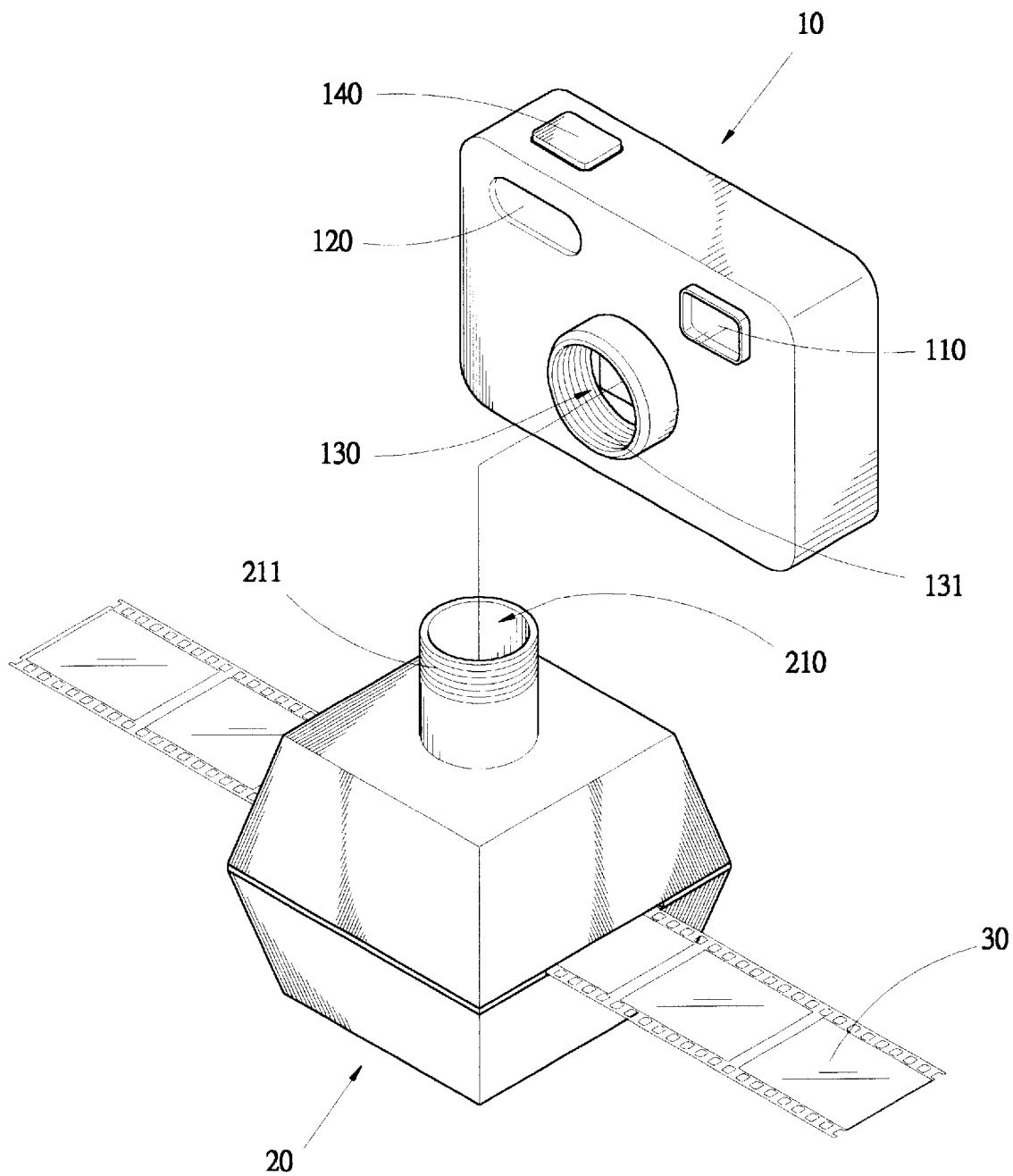
FIG. 2 is an exploded view of the present invention showing the film-scanning module and image-capturing module separated.
Figure 3:
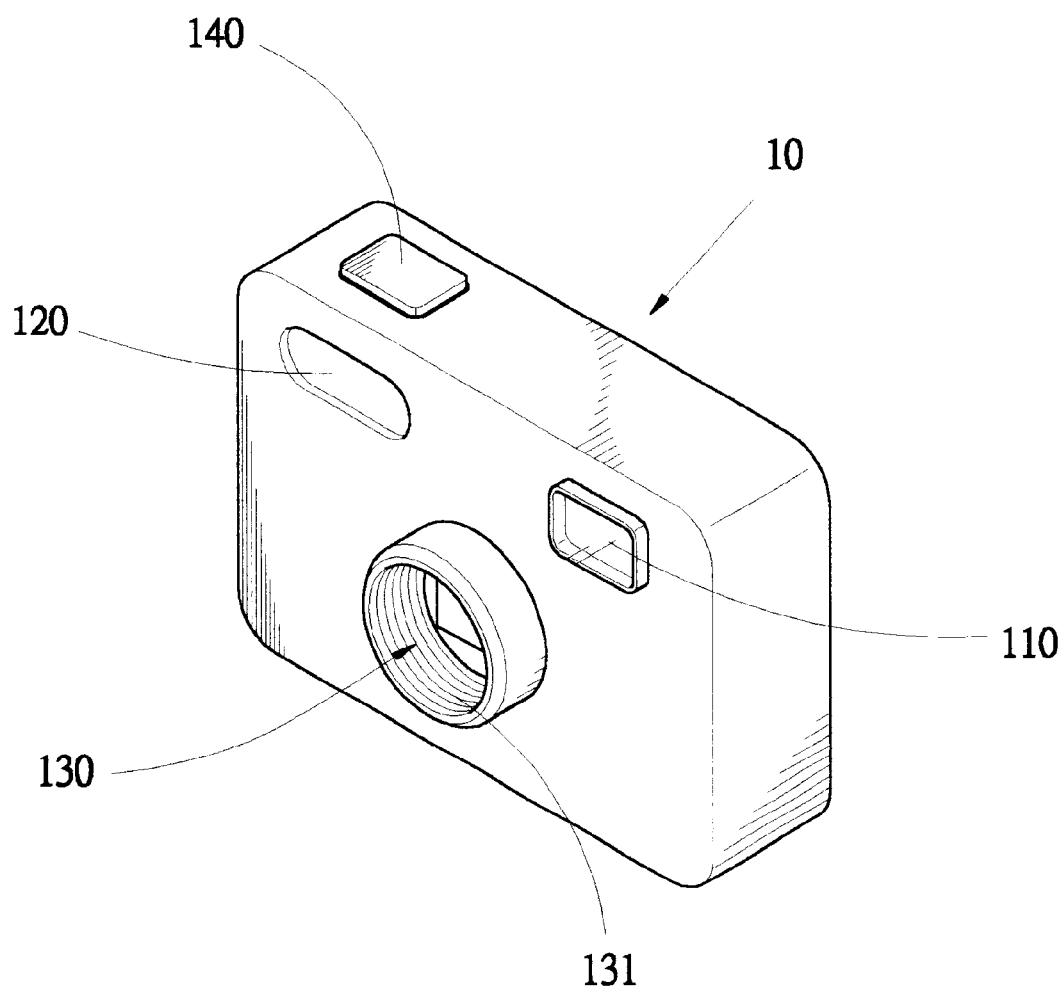
FIG. 3 is a perspective view of the image-capturing module of the present invention.
Figure 4:
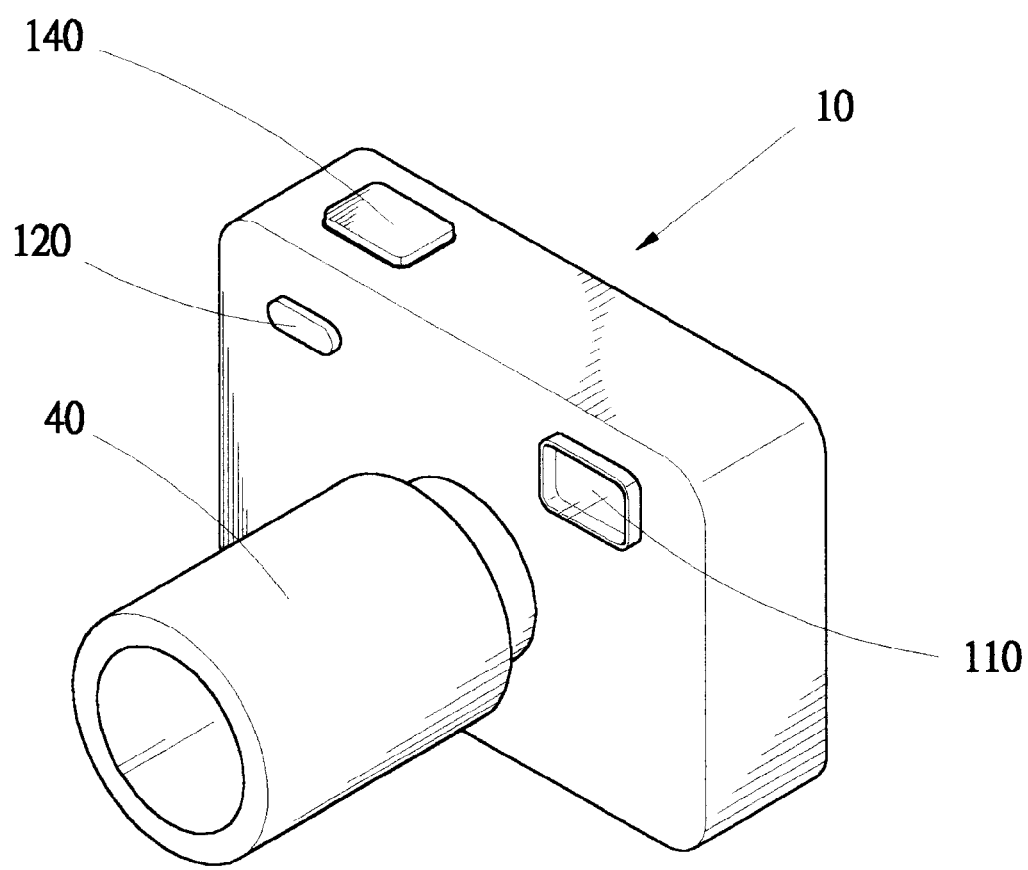
FIG. 4 is a perspective view showing the combination of the image-capturing module and the lens designed for long conjugate distance.
Figure 5:
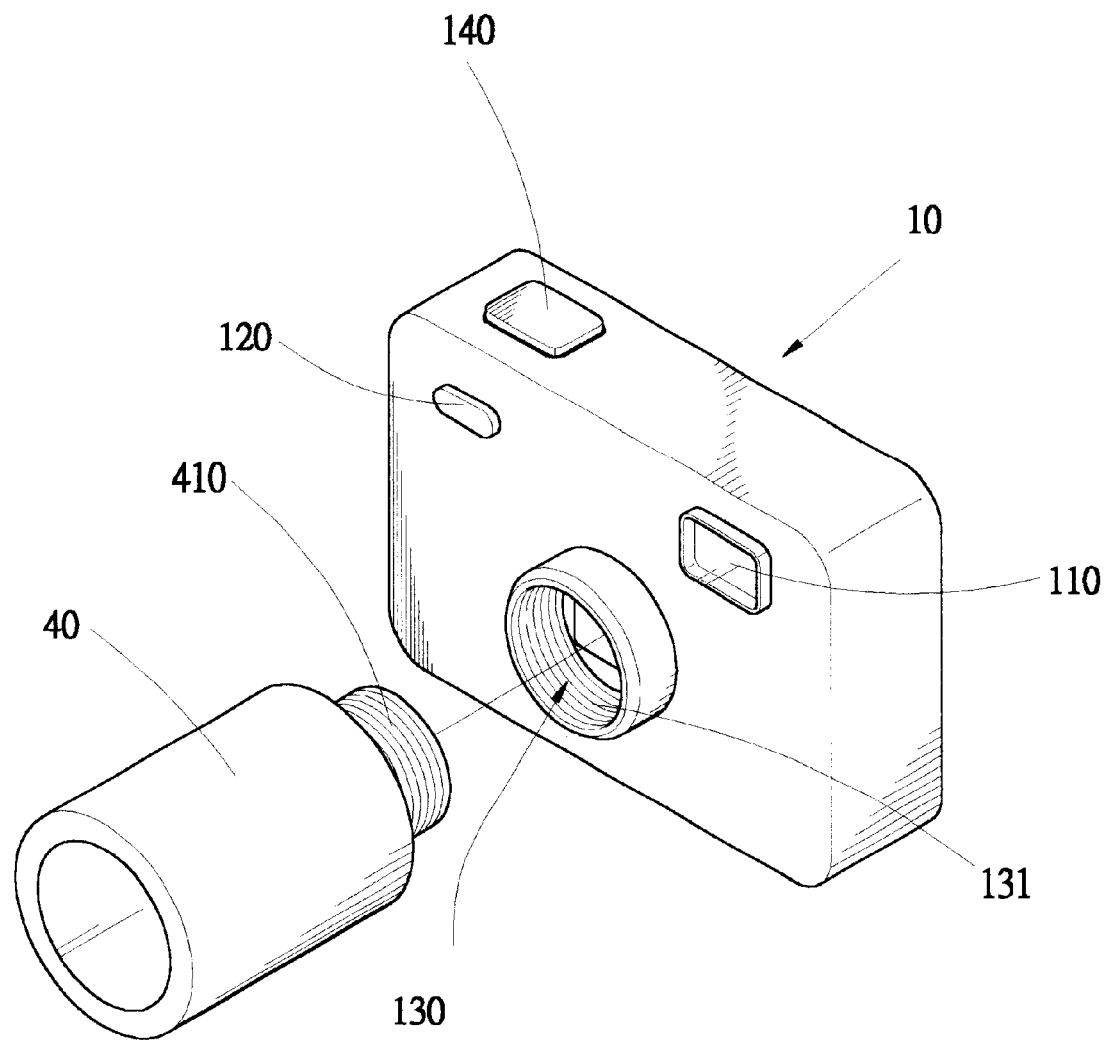
FIG. 5 showing the lens designed for long conjugate distances detached from the image-capturing module of the present invention.
Figure 6:
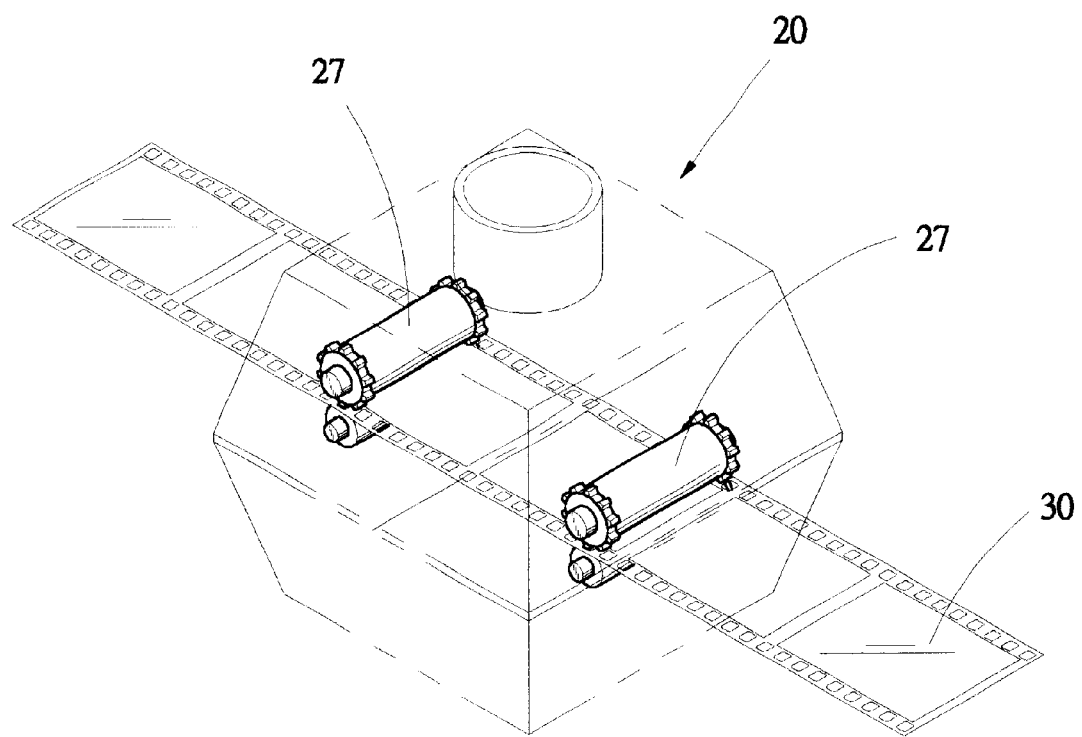
FIG. 6 is a perspective view showing the transparent film feeding rollers.

With reference to FIGS. 1~2 and FIGS. 6~7, a film-scanning module 20 can be attached to and detached from the front side of the image-capturing module 10 by a connecting means 220, such as an outer spiral structure of the film-scanning module 20 corresponding to an inner spiral structure 131 of the image-capturing module 10. The module 10 can become a film-scanning apparatus with the film-scanning module 20. A transparent film 30 can be inserted into the module 20 by a film carrier, such as a film roller 27 (see FIG. 6 in which shows a pair of film rollers 27) and be set a correct location for capturing the film images. The film rollers 27 also can resist the light source from outside of the module 20. The film-scanning module 20 has a lens assembly 210 designed for short conjugate distances. The transparent film 30 can be inserted into the slot (not labeled) through the film-scanning module 20. The image-capturing module 10 includes a viewfinder 110 and a flashlight 120 in the front of the module 10. The viewfinder 110 has an objective lens in the front of the image-capturing module 10 and an eyepiece (not shown) in the rear of the image-capturing module 10. The image-capturing module 10 further comprises a set base 130 with the inner spiral structure 131 in the front of module 10 for accepting the interchangeable and detachable image-forming modules. A shutter control button 140 is set on the top of the image-capturing module 10 to control the action of the shutter circuit and the processing circuit (not shown) inside the image-capturing module 10. An image sensor 160 is arranged in the direction perpendicular to the optical axis of the focus lens 70 inside the module 10. The image sensor 160 can be a 2-dimensional sensor array such as 2-dimensional CCD or CMOS With reference to FIG. 4 and FIG. 5, the image-capturing module 10 can be combined with a lens 40 designed for long conjugate distances by inner spiral structure 131 corresponding to the outer spiral connecting means 410. When the lens 40 attached to the front of the image-capturing module 10, the module 10 can be used for the general photography as conventional digital cameras.

Figure 7:
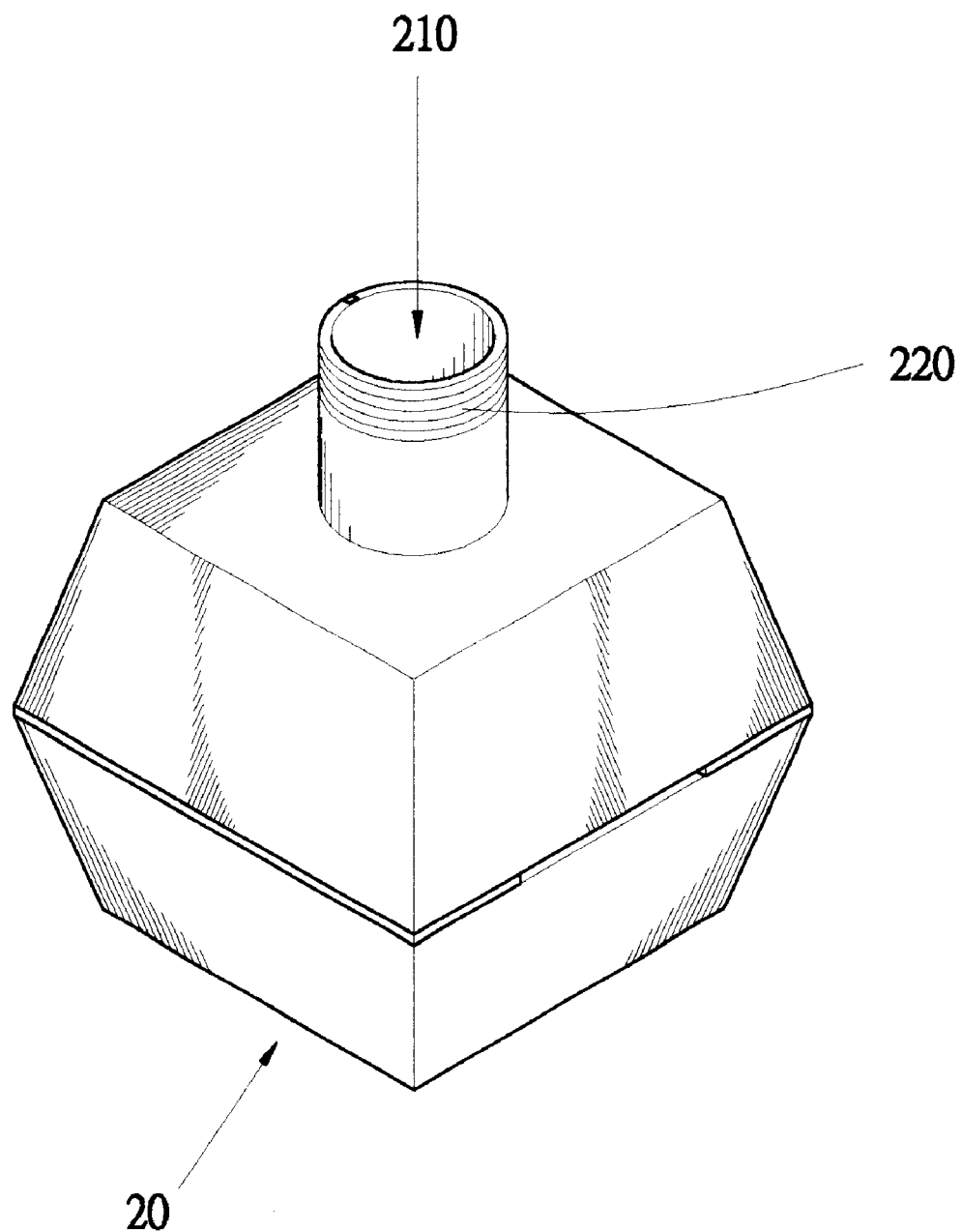
FIG. 7 shows the film-scanning module with a spiral connecting structure.
Figure 8:
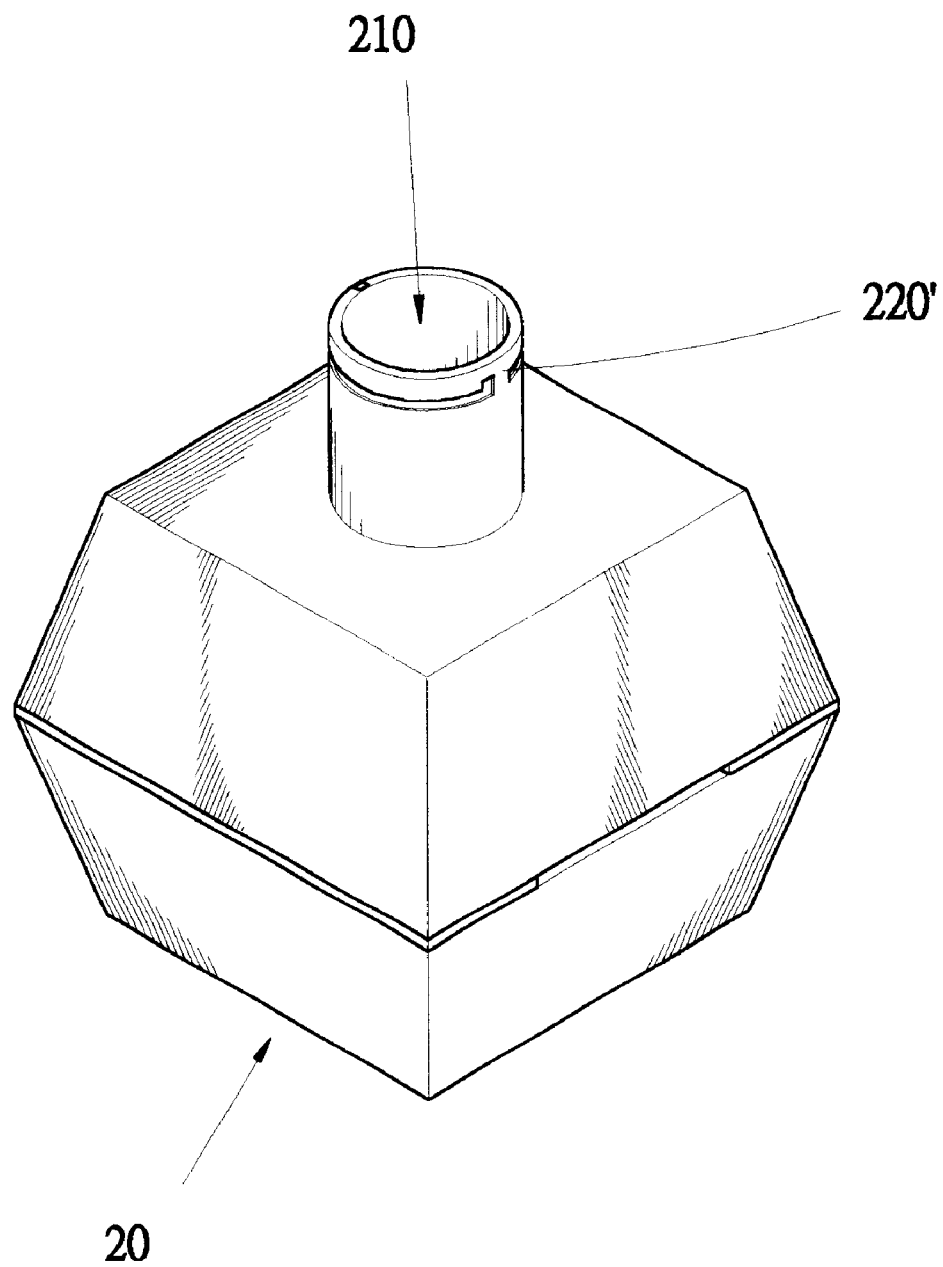
FIG. 8 shows a connecting means of push and twist fastener of the film-scanning module with image-capturing module.
Figure 9:
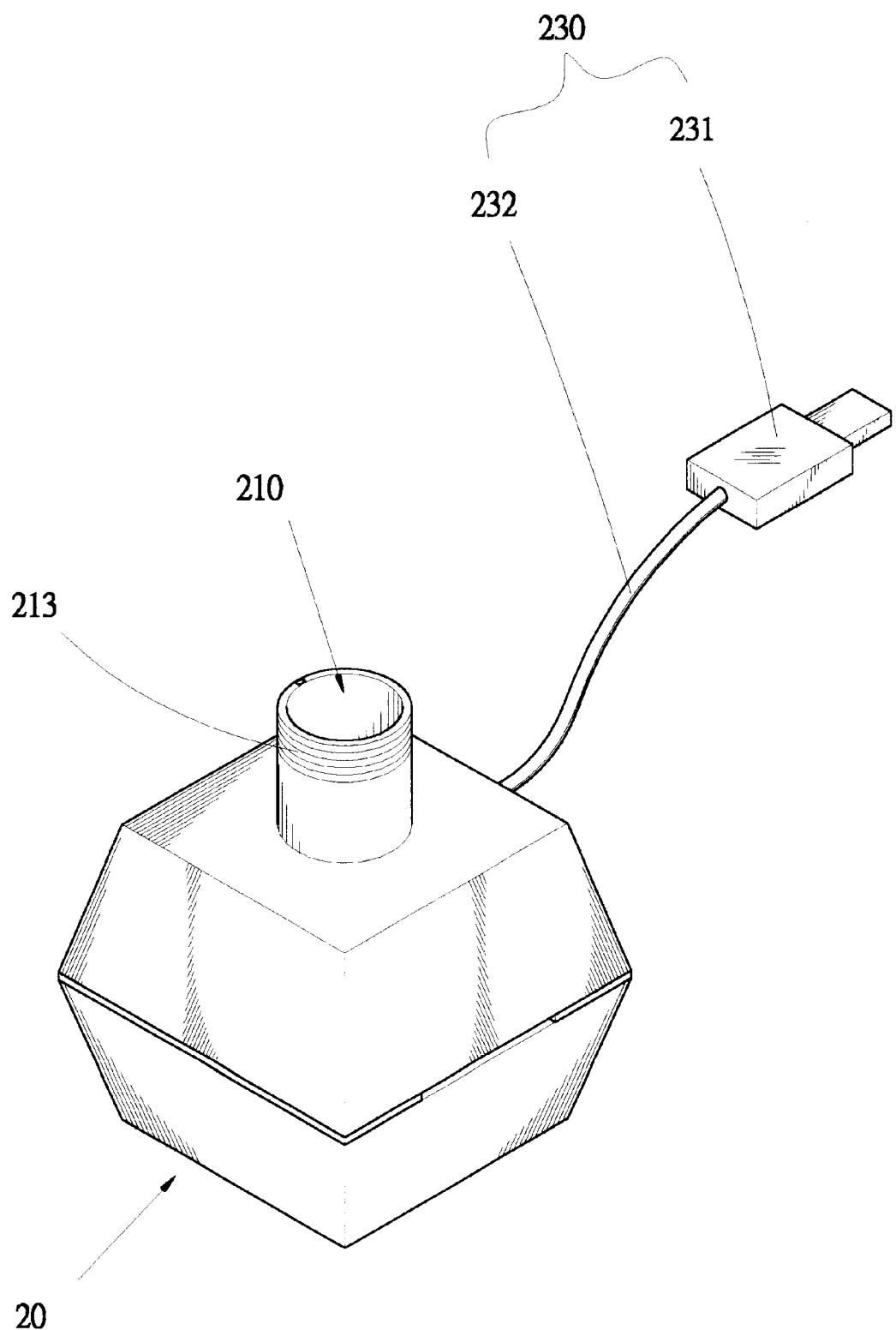
FIG. 9 shows the film-scanning module having an electrical connector and cable assembly.

FIGS. 7–9 are drawings of some different embodiments for connecting the mechanism and control circuit between the film-scanning module 20 and the image-capturing module 10. In one embodiment described in FIG. 7, the connecting means 220 utilized an outer spiral structure corresponding to the set base 130 of the image-capturing 10. Another embodiment shown in FIG. 8, the connecting means 220' is a design of a push and twist fastener. The set base 130 of the image-capturing module 10 is correspondingly designed. The connecting means 220 or 220' can further comprise electrical connecting contacts (not shown) corresponding to the set base 130 in order to connect the control circuits in the image-capturing module 10 and the film-scanning module 20. Furthermore, in accordance with FIG. 9, this embodiment shows another method that utilized an electrical connecting means 230, such as an electrical connector 231 and cable assembly 232 for connecting the control circuit in the module 10 and the module 20.

Figure 10:
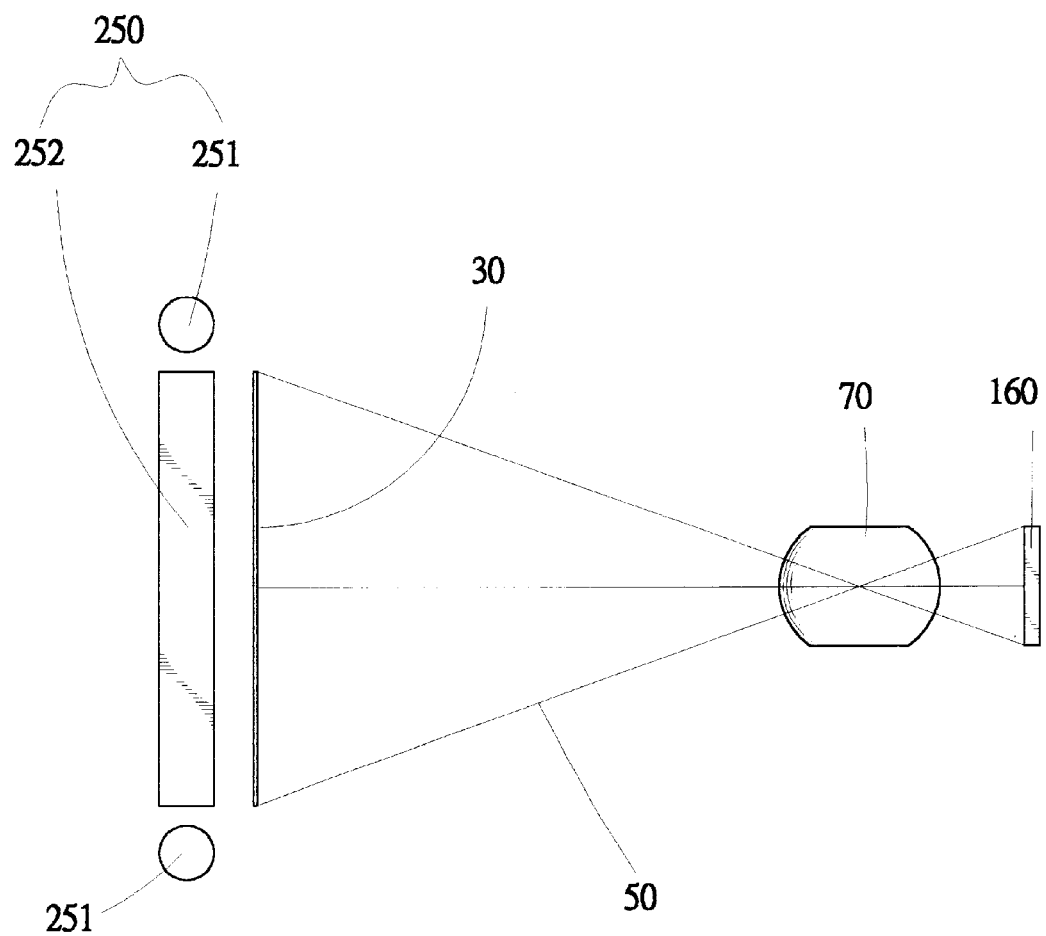
FIG. 10 shows the normal constitution of the basic devices inside the film-scanning module.
Figure 11:
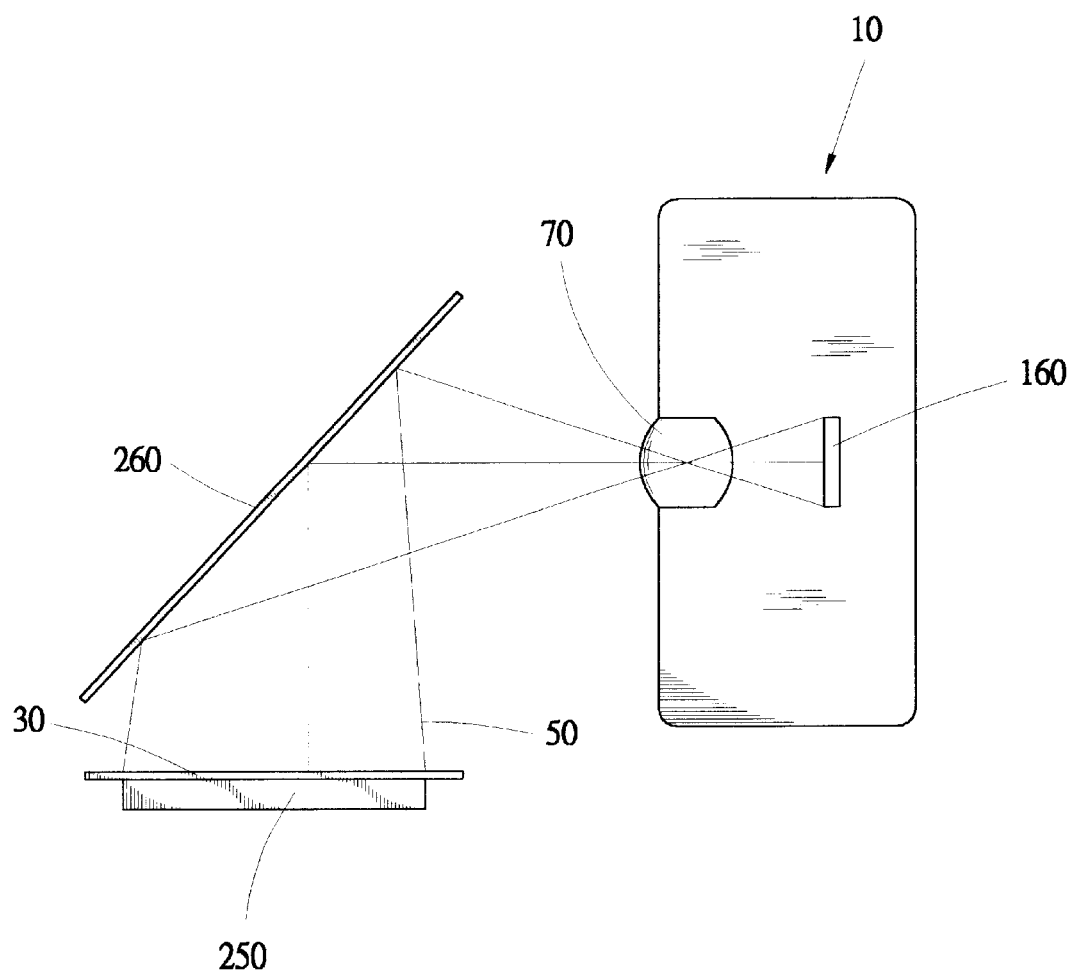
FIG. 11 is an illustration of placing the illumination device and transparent film in the left-front side of the focus lens by use a reflective mirror.
Figure 12:
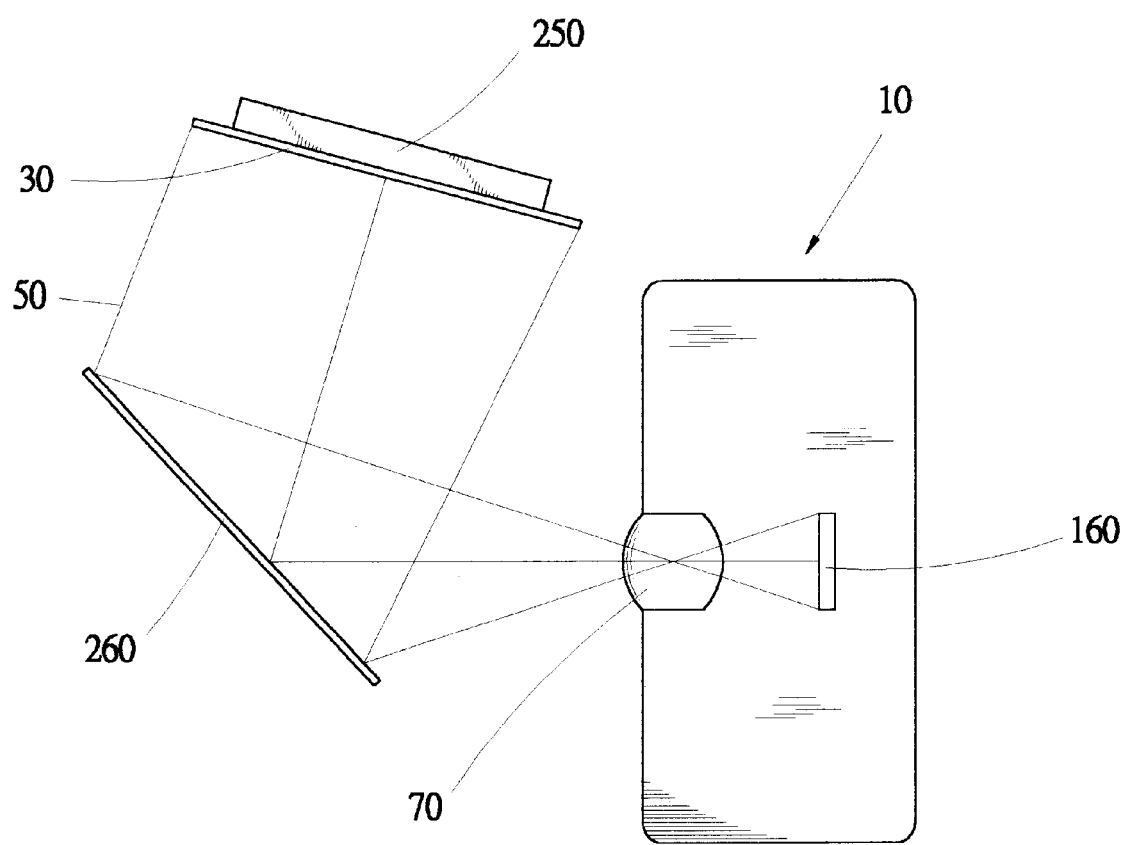
FIG. 12 is an embodiment of placing the illumination device and transparent film in the right-front side of the focus lens by use a reflective mirror.

Inside the film-scanning module 20, there are several methods for guiding the light path 50 of the film image through a lens 70 and forming onto a digital image sensor 160 by illuminating of an illuminated means 250 (see FIG. 10). The illuminated means 250 is disposed at the position behind the film 30 with the same direction. The streams of light irradiate from the illuminated means 250 in the direction is substantially perpendicular to the transparent film 30. The illuminated means 250 comprises a lightening means 251 and a light diffuser 252. The lightening means 251 can be light emitting diodes, florescence discharge lamps, and inert gas discharge flash lamps. The illumination brightness and duration are controlled by the image-capturing device through electronic connecting means. The irradiation of the lightening means 251 diffused and equalized by a light diffuser 252 which pass through the transparent film 30 and the focus lens 70 then form image signals onto the image sensor 160 finally.

Figure 13:
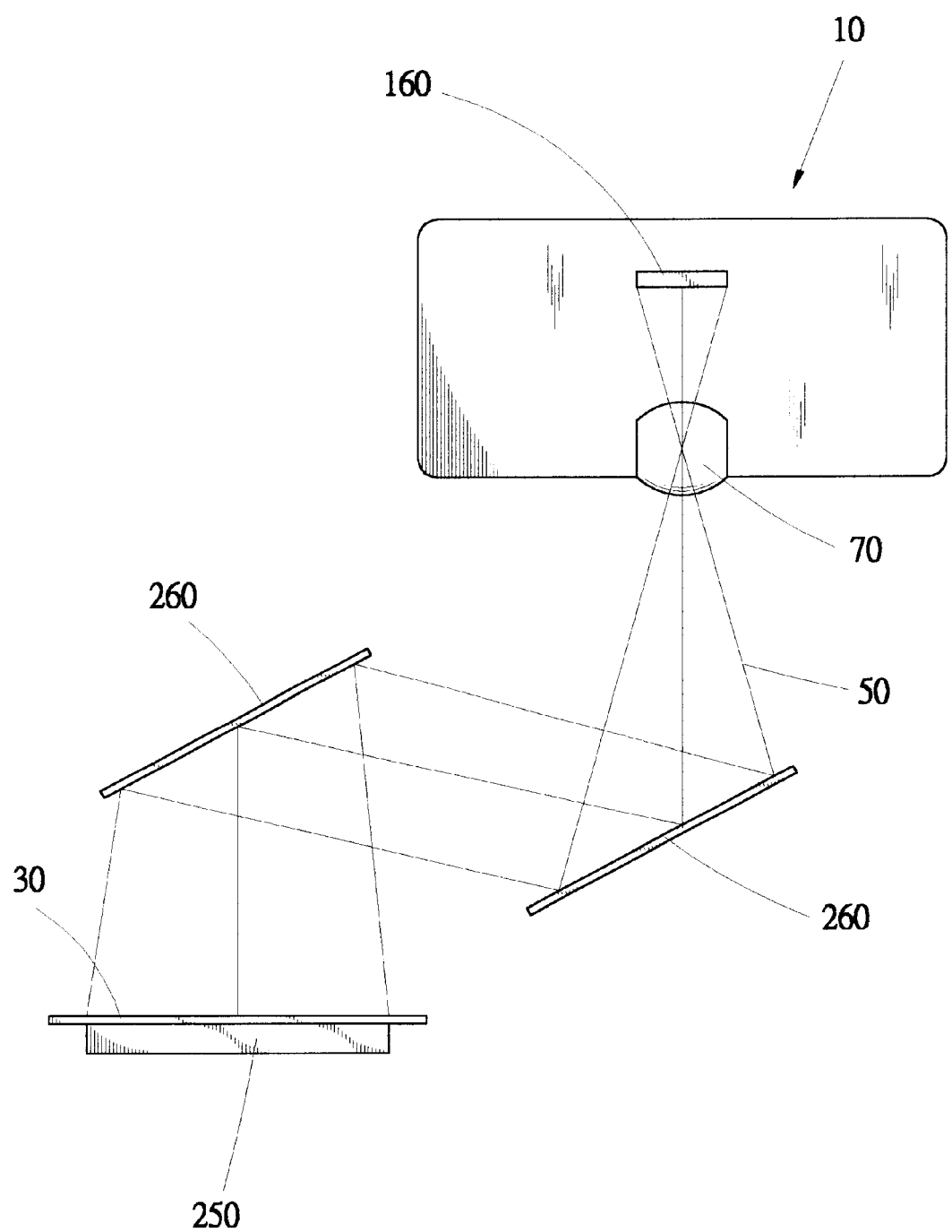
FIG. 13 is an illustration of a method for reducing the distances between the focus lens and the transparent film by utilizing a set of reflective mirrors.

A reflection mirror 260 is used in order to reduce the actual distance between the lens 70 and the transparent film 30. FIG. 13 shows the embodiment of using two reflection mirrors 260 for shortening the distances from the film 30 to the focus lens 70.

Figure 14:
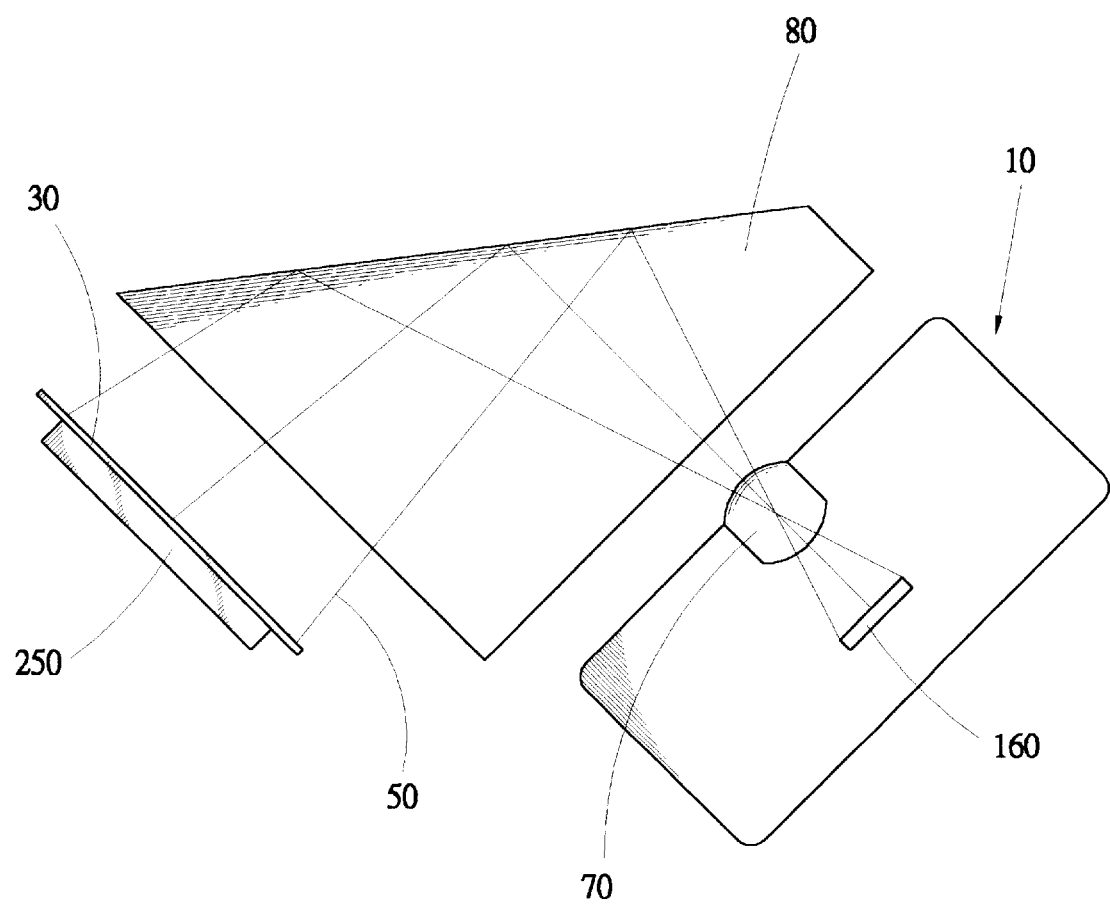
FIG. 14 is a drawing of the film-scanning module with a prism to guide the light path from the illumination to the image sensor which behind the focus lens.
Figure 15:
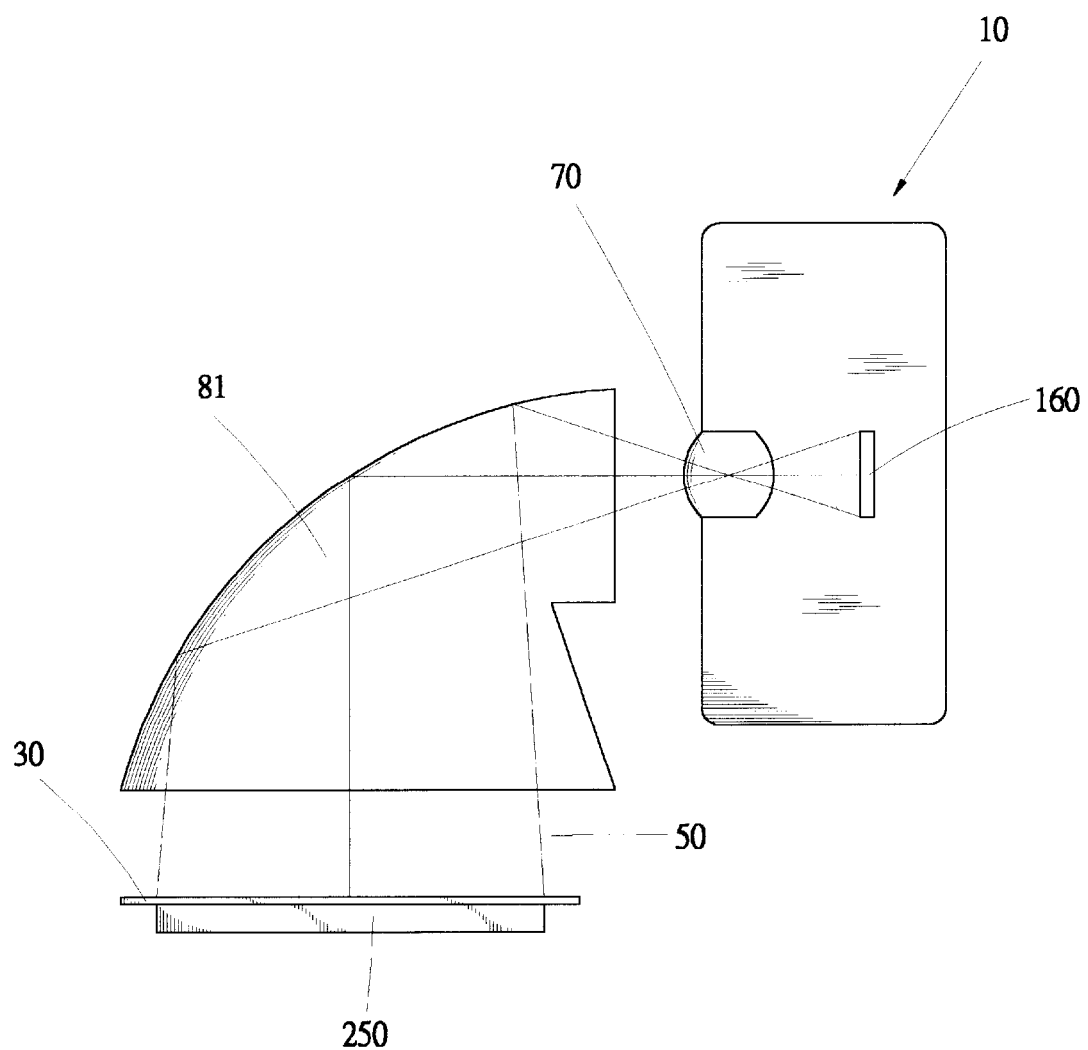
FIG. 15 is an illustration showing a convex prism which guides the light path from the illumination to the image sensor which behind the focus lens.
Figure 16:
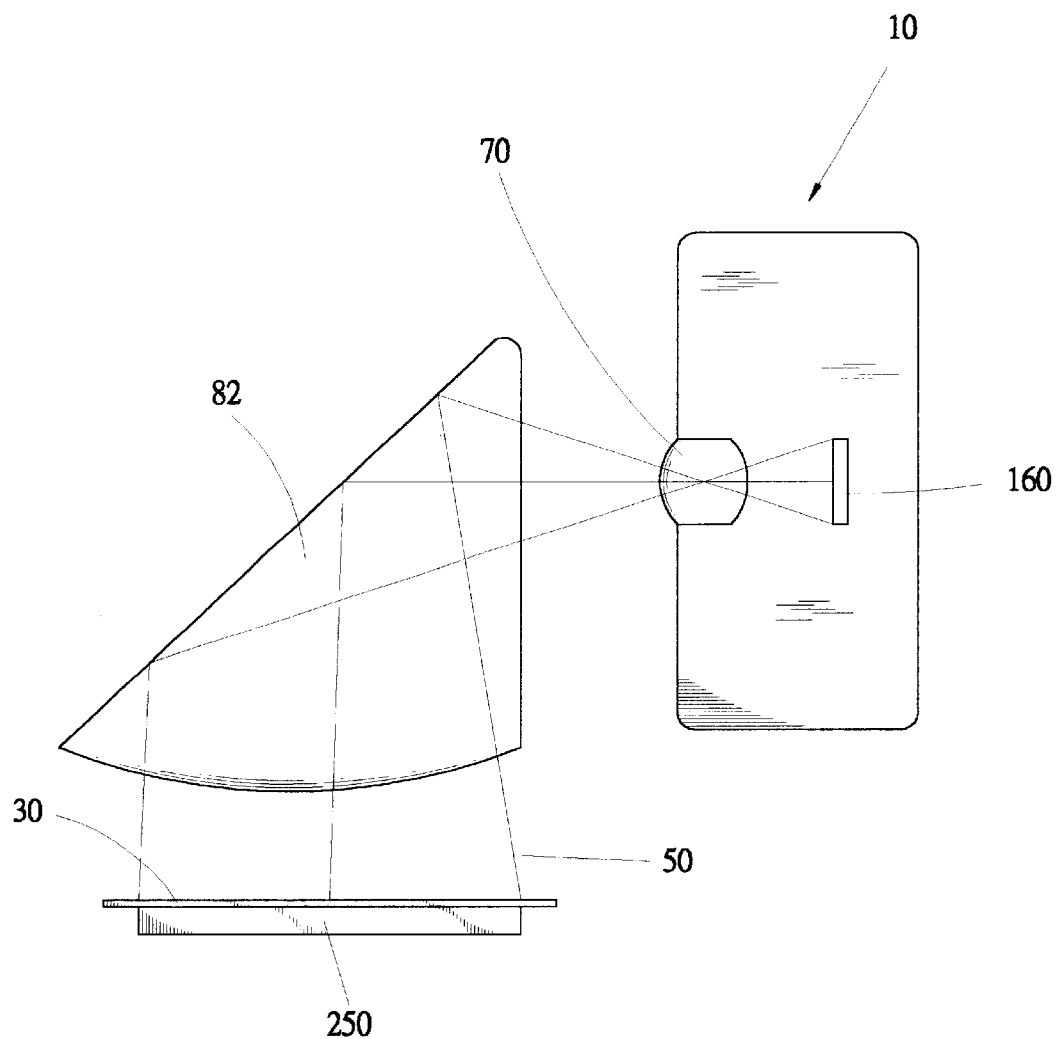
FIG. 16 is an illustration of the film-scanning module uses a triangular convex prism for guiding the light to the image-capturing module.

As shown in FIG. 14, a prism 80 with a triangular cross-section utilized for guiding light path 50 through the focus lens 70 to the image sensor 160. Another embodiment is shown in FIG. 15 in which a fan-shaped prism 81 is used to refract the light path 50 from the transparent film 30 to the focus lens 70. In FIG. 16, a triangular optical prism 82 with a convex side in front of the focus lens 70 collects the beam of the illumination means 250 and reflects to the lens 70.

Figure 17:
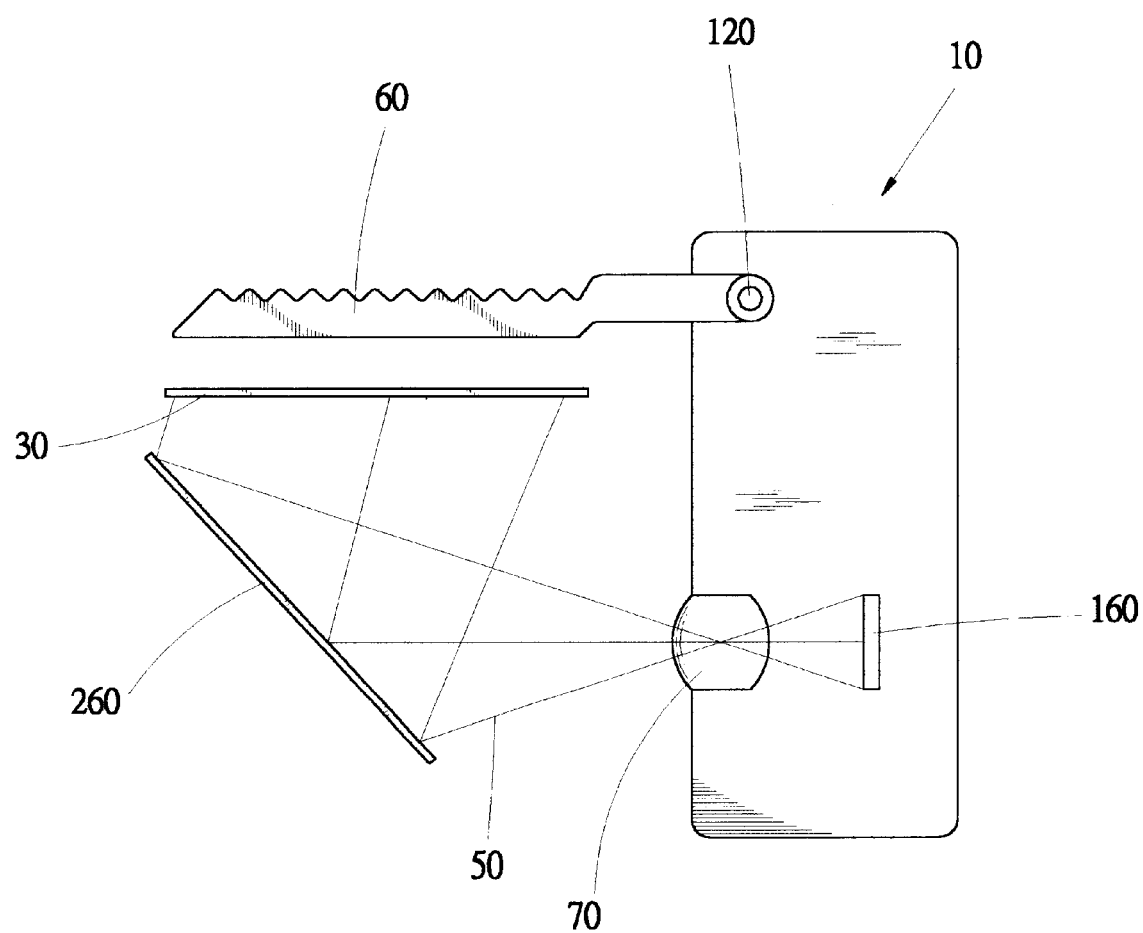
FIG. 17 is an embodiment of the film-scanning module utilizes a light pipe for guiding the flashlight energy to illuminate the film.

A special embodiment of the illuminated devices is shown in FIG. 17. At least a light pipe 60 can be applied to guide the light from the flashlight 120 for illuminating the transparent film 30.

Although the present invention has been described with reference to the preferred embodiments thereof, it is apparent to those skilled in the art that a variety of modifications and changes may be made without departing from the scope of the invention which is intended to be defined by the appended claims.

What is claimed is:

1. A modular electronic image-capturing system comprising:
   at least two interchangeable image-forming modules which include:
      a) an optical lens of at least one optical element construction designed for long conjugate object distances, and
      b) a film-scanning module; and,
   an electronic image-capturing module selectively coupled to one of said interchangeable image-forming modules, said electronic image-capturing module including:
      a) at least one 2-dimensional array type electronic image sensor, and
      b) a mechanical interface for releasable coupling to said interchangeable image-forming modules;
   said film scanning module including:
      i) a housing,
      ii) a mechanical interface extending from an outer surface of said housing for coupling to said mechanical interface of said electronic image-capturing module,
      iii) a mechanical carrier for holding a photographic film within said housing,
      iv) an optical lens of at least one optical element construction for focusing an image from the photographic film on said electronic image sensor,
      v) an illumination source positioned to illuminate the photographic film, and
      vi) a prism disposed between said optical lens and said mechanical carrier for transmitting light rays corresponding to the image from the photographic film to the optical lens, said prism increasing an optical path between the photographic film and said lens.

2. The modular electronic image-capturing system as recited in claim 1, wherein said prism has at least one arcuate surface.

3. The modular electronic image-capturing system as recited in claim 2, wherein said at least one arcuate surface said prism defines a reflective surface.

4. The modular electronic image-capturing system as recited in claim 2, wherein said at least one arcuate surface said prism defines a transmissive surface.

5. A modular electronic image-capturing system comprising:
   a. a film-scanning module, said film scanning module including:
      i) a first housing,
      ii) a first mechanical interface extending from an outer surface of said first housing,
      iii) a mechanical carrier for holding a photographic film within said first housing, and
      iv) an optical lens of at least one optical element construction for focusing light rays corresponding to an image from the photographic film;
   b. an electronic image-capturing module releasably coupled to said film-scanning module, said electronic image-capturing module including:
      i) a second housing,
      ii) a second mechanical interface disposed on an outer surface of said second housing for releasable coupling with said first mechanical interface,
      iii) a shutter control button disposed on said second housing,
      iv) an electronic image sensor disposed in said second housing for impingement by the light rays corresponding to the image from the photographic film responsive to operation of said shutter control button, and
      v) a flash lighting source disposed on said second housing for output of illumination in correspondence with operation of said shutter control button; and,
   c. a light pipe extending from said flash lighting source to a position within said first housing to illuminate the photographic film responsive to said illumination output from said flash lighting source.

* * * * *